Oct. 16, 1923.
J. L. FOSS
DERRICK HOOK
Filed Aug. 19, 1922
1,471,117
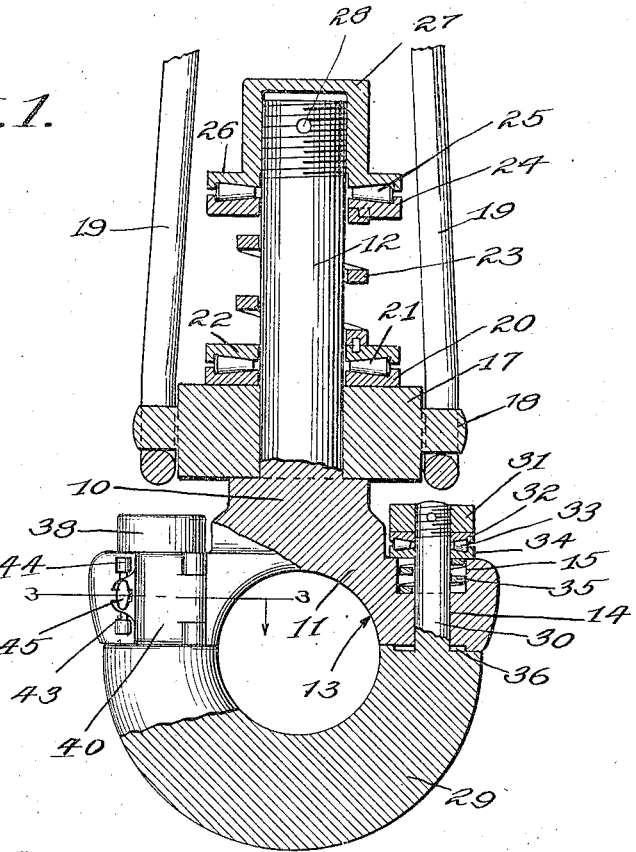
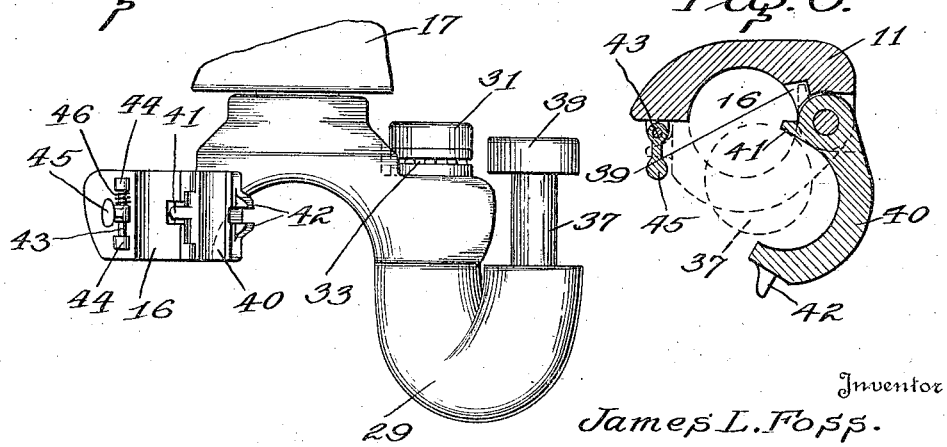
Inventor
James L. Foss.
By Watson E. Coleman
Attorney Patented Oct. 16, 1923.

1,471,117

UNITED STATES PATENT OFFICE.

JAMES L. FOSS, OF LOS ANGELES, CALIFORNIA.

DERRICK HOOK.

Application filed August 19, 1922. Serial No. 583,006.

*To all whom it may concern:*

Be it known that I, JAMES L. FOSS, a citizen of the United States, residing at Los Angeles, in the county of Los Angeles and State of California, have invented certain new and useful Improvements in Derrick Hooks, of which the following is a specification, reference being had to the accompanying drawings.

This invention relates to derrick hooks, and one of the objects of the invention is to provide a hook of this character which is resiliently supported upon its hangers so as to avoid liability of breakage.

A further object is to provide a hook of this character in which the hook is made in two sections, the lower section or bill of the hook being pivotally mounted upon the upper section or body of the hook so as to swing toward or from a closed position, there being a latch whereby the hook is held in its closed position, thus preventing accidental detachment of the article being handled from the hook.

A still further object is to provide a hook of this construction in which the body is resiliently supported from the hangers and is freely swiveled relative to the hangers, the hook being provided with a pivoted bill swinging in a horizontal plane to or from a closed position, and provide anti-frictional supports for the bill so that it may be readily swung, and provide a latch opened upon the opening of the bill of the hook but automatically closing when the bill is swung into a position of registration with the body of the hook so as to hold the bill closed against accidental detachment.

Other objects will appear in the course of the following description.

My invention is illustrated in the accompanying drawings, wherein:—

Figure 1 is an elevation partly in section of my improved derrick hook;

Figure 2 is an elevation of the lower portion of the hook and showing the hook opened;

Figure 3 is a section on the line 3—3 of Figure 1, but showing the latch gate opened.

Referring to these drawings, 10 designates the body of the hook, this body being approximately T-shaped so as to provide a head 11 and a shank 12. The head 11 at its lower end is formed with a semi-circular recess 13 and one arm of the T-shaped head is provided with a vertical opening 14 having a countersunk recess 15 in the upper face of the head. The opposite arm is formed with a semi-cylindrical recess 16. The shank 12 is screw-threaded at its upper end and passes through a plate or cross bar 17 which has trunnions 18 supported in hangers or bails 19, these hangers being connected in any suitable manner to the cable or chain of the derrick (not shown).

Resting upon the member 17 is a lower race 20 supporting the anti-friction cones 21, upon which rests an upper race 22. Surrounding the shank 12 is a relatively heavy coiled compression spring 23 whose lower end is locked or keyed to the upper face 22. At its upper end the coiled compression spring is locked or keyed to a lower race member 24 supporting anti-friction cones 25, in turn supporting an upper race member 26 which is formed integral with a cap 27 which has screw-threaded engagement with the screw-threads at the upper end of the shank 12. This cap is pinned to the shank 12 by means of a pin 28 passing transversely through the shank and through the cap. It will be seen that any weight on the hook is supported by the spring 23 and that the hook is swiveled in the place 17 and is supported by anti-friction bearings 21 and 25 so as to have free rotation around the axis of the shank 12.

Coacting with the head 11 is the semi-circular lower portion or bill 29 of the hook. This at one end has a pintle 30 which passes through the opening 14 and at its upper end is screw-threaded for engagement with a cap nut 31 which is pinned to the upper end of the pintle, this cap nut carrying an upper raceway 32 resting upon cones or other anti-friction bearings 33, in turn resting upon a lower raceway 34, which in turn is supported by a relatively short coiled compression spring 35 disposed in the countersunk recess 15. An oil recess 36 is formed between the lower face of the head 11 immediately surrounding the bore 14 and the upper end face of the hook 29. The opposite end of the hook 29 is formed with an upwardly projecting stud 37 relatively small in diameter and having a head 38. At one side of the half bore 16 formed in one arm of the T-shaped head 11 there is pivoted a gate 40 having a semi-circular recess in its inner face, this gate being formed with a projection or lug 41 adjacent the point of pivotal engagement which is accommodated by a recess 39 in the head 11, as shown in Figure 3. The free edge of the gate is formed with a pair of lugs 42. When the hook swings from the position shown in Figure 2 to the position shown in Figure 1, the stud 37 strikes the lug 41 and swings the gate upon its hinge to a closed position.

Mounted on the end face of the head 11 on the opposite side of the recess 16 from the hinged connection of the gate there is a latch comprising a member 43 having vertical trunnions mounted in lugs 44, this member having a latching head 45, and a spring 46 holds this member 43 in latching position. When the gate closes, this latching member 43 engages with the lugs 42 and holds the gate closed and the hook in its closed and locked position.

This device is particularly adapted for derrick hooks, though obviously it may be used in a large variety of circumstances. The support 10 for the hook and the shank 12 is swivelled relative to the hangers and the hook 29 when opened may be readily closed by simply placing a strain upon the hook which will rotate it upon the axis of the pintle 30 from its open to its closed position. The hook is then automatically locked and held locked until it is desired to unlock it and take off the member supported by the hook. With this construction there is no danger of the article which is supported by the hook becoming disengaged from the hook and any accidents happening from this cause, nor is there any necessity of manually closing the gate 40 nor latching this gate. The spring 35 causes the hook to close readily and open readily. The device is simple and thoroughly effective for the purpose intended.

I claim:

1. A derrick hook of the character described comprising a hanger including an apertured plate, a hook body having a shank swiveled to said plate, means permitting a rotation of the shank relative to the hanger, the body having an approximately T-shaped head, a hook pivoted upon one arm of the head and shiftable at right angles to the axis of the shank into or out of a position of alignment with the head, and means automatically locking the hook when in a position of alignment with the head.

2. In a derrick hook, a hanger, a body having a shank swiveled in the hanger for rotation in a plane at right angles to the shank, a compression spring surrounding the shank and operatively supporting it from the body, a hook having a shank rotatably mounted in the body, the hook being oscillatable from an open position to a closed position, and means automatically locking the hook in its closed position when the hook is swung into alignment with the body.

3. A derrick hook comprising a hanger including an apertured plate, a hook body having a shank extending upward through the aperture of said plate, a compression spring surrounding the shank and operatively supporting it from the body, means permitting a rotation of the shank relative to the hanger, the body having an approximately T-shaped head, a hook pivoted upon one arm of the head and shiftable into or out of a position of alignment with the head, and means automatically locking the hook when in a position of alignment with the head.

4. A derrick hook of the character described comprising a hanger including an apertured plate, a body having a shank extending upward through the aperture of the plate, anti-friction means mounted upon the plate and including opposed races, anti-friction elements disposed between the races, anti-friction devices mounted upon the upper end of the shank and including opposed races, anti-frictional elements mounted between the races, a coiled compression spring surrounding the shank and disposed between the upper and lower adjacent races and operatively engaged therewith, a hook having a pintle rotatably mounted in one arm of the T-shaped head, the other end of the hook having a headed stud, the arm of the head remote from the pintle having a recess to receive said stud, a hinged gate adapted to close said recess, the stud and gate being formed to cause the closing of the gate and the stud to enter said recess, and means on the T-shaped head for locking the gate in closed position.

5. In a derrick hook, a T-shaped body having an aperture in one arm, the other arm having a vertical recess upon its face and a pivotally mounted gate adapted to close said recess, a hook having a pintle at one end extending upwardly through the first named arm, a compression spring resting upon the arm and surrounding the pintle, a head on the pintle, anti-friction members including opposed races and intermediate anti-friction bearings disposed between said head and the upper face of the arm and resting upon said compression spring, and means on the opposite arm for latching said gate in closed position.

In testimony whereof I hereunto affix my signature.

JAMES L. FOSS.